United States Patent Office 3,017,364
Patented Jan. 16, 1962

3,017,364
STABILIZING SULFUR-CONTAINING ALKALINE SOLUTIONS
Robert C. Henry, Carpentersville, Ill., assignor to Universal Oil Products Company, Des Plaines, Ill., a corporation of Delaware
No Drawing. Filed Dec. 10, 1959, Ser. No. 858,570
10 Claims. (Cl. 252—188)

This invention relates to the stabilization of sulfur-containing alkaline solutions and more particularly to a novel method of preventing the disappearance during storage of sulfur compounds contained in alkaline solutions.

Alkaline solutions containing sulfur compounds are produced in many ways. For example, in the treatment of hydrocarbon distillate containing hydrogen sulfide with caustic solution, the spent caustic solution contains sodium sulfides. Similarly, in the treatment of hydrocarbon distillate containing mercaptans, caustic solution containing sodium mercaptides is separated and recovered. For economic reasons, it is apparent that further utilization of the spent alkaline solution is desirable. However, during storage the sulfur compounds in the alkaline solution tend to disappear, and the present invention is directed to a novel method of reducing loss of the sulfur compounds.

The sulfur compounds contained in the spent alkaline solution will have varied use. For example, in the tanning industry, sodium sulfide is used as a reducing agent in lime solutions employed for removing hair and epidermis from animal skins. Alkaline sulfites are used in the sulfite process for the manufacture of paper from wood pulp. The sulfides contained in the spent alkaline solution may be oxidized to the sulfite and then used in the manufacture of paper. Methyl mercaptan is used in the manufacture of methionine, and methyl mercaptan may be recovered from the alkaline solution containing methyl mercaptide. The above are a few examples in which the spent alkaline solutions are useful. It is understood that these spent alkaline solutions may be used for any other suitable purpose.

As hereinbefore set forth, the sulfur compounds tend to disappear from the alkaline solution during storage thereof. Accordingly, it is desirable to stabilize the spent alkaline solution to prevent the disappearance of the sulfur compounds.

In one embodiment the present invention relates to a method of stabilizing a sulfur-containing alkaline solution which comprises incorporating therein a stabilizing concentration of a stabilizer selected from the group consisting of aminoalkanoic acid and alkaline salt thereof.

In a specific embodiment the present invention relates to a method of stabilizing caustic solution containing sodium sulfide which comprises incorporating therein from about 0.001% to about 10% by weight of ethylenediaminetetraacetic acid tetrasodium salt.

The alkaline solution containing sulfur compound generally will comprise an aqueous solution of caustic (NaOH) or of potassium hydroxide. However, it is understood that other alkaline solutions may be used as, for example, an aqueous solution of lithium hydroxide, rubidium hydroxide or cesium hydroxide, although these are more expensive and therefore generally are not used for this purpose. In some cases the alkaline solution may comprise an aqueous solution of ammonium hydroxide. When desired, the alkaline solution may comprise a mixture of the alkaline reagents. While the aqueous solutions generally are preferred, in some cases the solvent may comprise an alcohol such as methanol, ethanol, propanol, butanol, etc., a ketone such as dimethyl ketone, methyl ethyl ketone, diethyl ketone, methyl propyl ketone, dipropyl ketone, methyl butyl ketone, dibutyl ketone, methyl amyl ketone, etc., aldehydes such as acetaldehyde, propionaldehyde, butyraldehyde, etc., generally in admixture with water and, when desired, a mixture of the solvents recited above may be used.

The concentration of sulfur compounds in the alkaline solution will depend upon the particular method in which the alkaline solution is formed and accordingly may vary considerably. When the alkaline solution is recovered as a step in a purification treatment, the further use thereof offers the economic advantage resulting from the marketing of the solution and also the important advantage of avoiding a serious disposal problem. Because of the sulfur compounds contained therein, the spent alkaline solution cannot be disposed of into a neighboring stream.

In accordance with the present invention, the alkaline solution is stabilized by incorporating therein an aminoalkanoic acid or salt thereof. Any suitable aminoalkanoic acid or salt thereof may be employed. Preferred aminoalkanoic acids include alkylenepolyamineacetic acids and their sodium or potassium salts. More particularly these comprise ethylenediaminetetraacetic acid, ethylenediaminetetraacetic acid tetrasodium salt, diethylenetriaminepentaacetic acid, diethylenetriaminepentaacetic acid pentasodium salt, N-hydroxyethylethylenediaminetetraacetic acid, N-hydroxyethylethylenediaminetetraacetic acid trisodium salt, etc. Other alkylenepolyaminealkanoic acids include ethylenediaminediacetic acid, ethylenediaminetriacetic acid, diethylenetriaminediacetic acid, diethylenetriaminetriacetic acid, diethylenetriaminetetraacetic acid, triethylenetetraaminediacetic acid, triethylenetetraaminetriacetic acid, triethylenetetraaminetetraacetic acid, triethylenetetraaminepentaacetic acid, triethylenetetraaminehexaacetic acid, tetraethylenepentaaminediacetic acid, tetraethylenepentaaminetriacetic acid, tetraethylenepentaaminetetraacetic acid, tetraethylenepentaaminepentaacetic acid, tetraethylenepentaamine hexaacetic acid, tetraethylenepentaamineheptaacetic acid, etc., N-hydroxyalkylalkylenepolyamines including N-hydroxymethylethylenediaminediacetic acid, N-hydroxymethylethylenediaminetriacetic acid, N-hydroxyethylethylenediaminediacetic acid, N-hydroxypropylethylenediaminediacetic acid, N-hydroxypropylethylenediaminetriacetic acid, N-hydroxypropylpropylenediaminediacetic acid, N-hydroxypropylpropylenediaminetriacetic acid, N-hydroxybutylethylenediaminediacetic acid, N-hydroxybutylethylenediaminetriacetic acid, N-hydroxypropylpropylenediaminediacetic acid, N-hydroxypropylpropylenediaminetriacetic acid, etc., the corresponding propionic acid derivatives, butyric acid derivatives, etc. and the sodium salts of the above recited compounds.

In another embodiment the aminoalkanoic acid is an hydroxyalkyl glycine. Preferred compounds in this class comprise di-(beta-hydroxyethyl) glycine, di-(beta-hydroxypropyl) glycine, di-(beta-hydroxybutyl) glycine, etc., the sodium salts thereof, di-(beta-hydroxyethyl) beta-alanine, di-(beta-hydroxypropyl) beta-alanine, di-(beta-hydroxybutyl) beta-alanine, etc., and the sodium salts thereof. In still another embodiment the aminopolyalkanoic acid is aminodiacetic acid, aminodipropionic acid, etc., and the sodium salts thereof.

While the sodium salts generally are preferred, the corresponding potassium salts may be employed. In some cases the salts may comprise the lithium salt, the rubidium salt or the cesium salt, although these are more expensive and generally are not used for this purpose.

While the aminoalkanoic acids and their alkaline salts serve to retard the loss of sulfur compounds from the alkaline solutions, it has been found that a mixture of these aminoalkanoic acid salts are even more effective in preventing the loss of sulfur compounds. As will be shown in the appended examples, a particularly preferred mixture is an equal mixture of (1) pentasodium salt of diethylenetriaminepentaacetic acid, (2) trisodium salt of N-hydroxyethylethylenediaminetriacetic acid, and (3) a mixture of tetrasodium salt of ethylenediaminetetraacetic acid and disodium salt of di-(beta-hydroxyethyl) glycine.

It is understood that the various aminoalkanoic acids which may be used in the present invention are not necessarily equivalent and also that various mixtures thereof may be used.

The aminoalkanoic acids will be used in a sufficient concentration to retard loss of sulfur compounds. In general the stabilizing concentration will range from about 0.001% to about 10% and preferably from about 0.01% to about 5% by weight of the alkaline solution.

The aminoalkanoic acid, salt or mixture thereof, is added to the alkaline solution containing sulfur compound in any suitable manner. Generally this is accomplished at ambient temperature, although elevated temperature, which generally will not exceed about 200° F., may be employed. The addition preferably is accompanied with suitable mixing in order to obtain uniform distribution of the stabilizer throughout the alkaline solution. This may be accomplished in any suitable manner, including passing the mixture through orifices, turbulence created by pumping, use of stirring paddles in a storage tank, etc.

The following examples are introduced to illustrate further the novelty and utility of the present invention but not with the intention of unduly limiting the same.

EXAMPLE I

This example illustrates the loss of hydrogen sulfide in potassium hydroxide solution. The solution of hydrogen sulfide was prepared by passing equal amounts of a homogeneous solution of hydrogen and hydrogen sulfide through a series of identical gas scrubbers, each containing 100 ml. of 13% aqueous potassium hydroxide solution. The scrubbers were closed off and allowed to stand at room temperature for varying lengths of time. The loss in hydrogen sulfide was determined by titrating against 0.01 normal silver nitrate solution. The results of these analyses are shown in the following table:

*Table I*

| Hours: | Hydrogen sulfide, mg. |
|---|---|
| 1.3 | 13.18 |
| 6.3 | 12.90 |
| 27.5 | 7.83 |
| 193.0 | 0.19 |

From the data in the above table it will be seen that the hydrogen sulfide content dropped to 0.19 mg. after standing for 193 hours.

EXAMPLE II

Another series of identical gas scrubbers were prepared in the same manner as described in Example I except that a mixture of sodium salts of aminoalkanoic acids was incorporated in a concentration of 1% by weight in each of the potassium hydroxide solutions. The mixture of sodium salts was an equal mixture of (1) pentasodium salt of diethylenetriaminepentaacetic acid, (2) trisodium salt of N-hydroxyethylethylenediaminetriacetic acid, and (3) a mixture of the tetrasodium salt of ethylenediaminetetraacetic acid and the disodium salt of di-(beta-hydroxyethyl) glycine. These materials are marketed commercially by the Dow Chemical Company as "Versenex-80," "Versenol-120," and "Versene-Fe-3," respectively.

The original hydrogen sulfide content of the scrubbers was 0.51 mg. After standing for 72 hours at room temperature, the average hydrogen sulfide content of 5 scrubbers containing the stabilizer was 0.496 mg.

From the data in the above table it will be seen that the mixed stabilizer was effective in substantially retarding the loss of hydrogen sulfide.

EXAMPLE III

Another series of scrubbers was prepared in substantially the same manner as described in Example II using the mixture of sodium salts as the stabilizer. The original hydrogen sulfide content of the scrubbers was 0.38 mg. After standing for 72 hours at room temperature, the average hydrogen sulfide content of 4 scrubbers was 0.325 mg. Here again it will be noted that the stabilizer was effective in retarding the disappearance of hydrogen sulfide.

EXAMPLE IV

This example illustrates the benefits of the present invention as applied to a potassium hydroxide solution containing mercaptans. A stock solution was prepared of n-butyl mercaptan in absolute alcohol. Five ml. of this solution were added to separate scrubbers, each containing 100 ml. of 13% aqueous potassium hydroxide solution. The scrubbers were allowed to stand exposed to air for various lengths of time and then were titrated with 0.01 normal silver nitrate solution. A series of 6 scrubbers was used as the control and did not contain a stabilizer. Five ml. of the stock solution had a mercaptan content equivalent to 2.41 ml. of 0.01 normal silver nitrate. After standing at room temperature for one hour, the mercaptan content dropped to 1.00 ml. The 5 remaining scrubbers, after standing for 24 hours, all had a zero content of mercaptan.

A series of 11 scrubbers containing the n-butyl mercaptan also contained 1% by weight of the stabilizer mixture described in Example II. These were analyzed at various times and the average results of two or more analyses are shown in the following table for different lengths of time.

*Table II*

| Hours: | Mercaptan content, ml. of 0.01 N AgNO$_3$ |
|---|---|
| 1 | 2.405 |
| 24 | 2.39 |
| 48 | 2.217 |
| 72 | 2.002 |

From the above data, it will be noted that, in the control scrubbers (no stabilizer), the mercaptan content was reduced to less than 50% after standing for one hour and that all had disappeared after standing for 24 hours in the absence of a stabilizer. On the other hand, when stored in the presence of the stabilizer, it will be noted that the disappearance of mercaptan sulfur was substantially retarded.

EXAMPLE V

A sodium hydroxide solution of 20° Baumé is used to treat cracked gasoline containing mercaptans. After use for considerable time, the caustic solution is withdrawn and will have a mercaptan sulfur content of about 6% by weight. Ethylenediaminetetraacetic acid tetrasodium salt is incorporated in the sodium hydroxide solution and serves to retard the loss of mercaptans therefrom.

I claim as my invention:

1. The method of stabilizing a sulfur-containing alkaline solution which comprises incorporating therein a stabilizing concentration of a mixture of ethylenediaminetetraacetic acid tetrasodium salt, diethylenetriaminepentaacetic acid pentasodium salt, N-hydroxyethylenediaminetriacetic acid trisodium salt and disodium salt of di-(beta-hydroxyethyl) glycine.

2. The method of stabilizing caustic solution containing sodium sulfide which comprises incorporating therein from about 0.001% to about 10% by weight of a stabilizer comprising a mixture of ethylenediaminetetraacetic acid tetrasodium salt, diethylenetriaminepentaacetic acid pentasodium salt, N-hydroxyethylethylenediaminetriacetic acid trisodium salt and disodium salt of di-(beta-hydroxyethyl) glycine.

3. The method of stabilizing potassium hydroxide solution containing potassium sulfide which comprises incorporating therein from about 0.001% to about 10% by weight of a stabilizer comprising a mixture of ethylenediaminetetraacetic acid tetrasodium salt, diethylenetriaminepentaacetic acid pentasodium salt, N-hydroxyethylethylenediaminetriacetic acid trisodium salt and disodium salt of di-(beta-hydroxyethyl) glycine.

4. The method of stabilizing caustic solution containing sodium mercaptide which comprises incorporating therein from about 0.001% to about 10% by weight of a stabilizer comprising a mixture of ethylenediaminetetraacetic acid tetrasodium salt, diethylenetriaminepentaacetic acid pentasodium salt, N-hydroxyethylethylenediaminetriacetic acid trisodium salt and disodium salt of di-(beta-hydroxyethyl) glycine.

5. The method of stabilizing potassium hydroxide solution containing potassium mercaptide which comprises incorporating therein from about 0.001% to about 10% by weight of a stabilizer comprising a mixture of ethylenediaminetetraacetic acid tetrasodium salt, diethylenetriaminepentaacetic acid pentasodium salt, N-hydroxyethylethylenediamine triacetic acid trisodium salt and disodium salt of di-(beta-hydroxyethyl) glycine.

6. A sulfur-containing alkaline solution additionally containing a stabilizer comprising a mixture of ethylenediaminetetraacetic acid tetrasodium salt, diethylenetriaminepentaacetic acid pentasodium salt, N-hydroxyethylethylenediaminetriacetic acid trisodium salt and disodium salt of di-(beta-hydroxyethyl) glycine.

7. Caustic solution containing sodium sulfide and additionally containing a stabilizing concentration of a stabilizer comprising a mixture of ethylenediaminetetraacetic acid tetrasodium salt, diethylenetriaminepentaacetic acid pentasodium salt, N-hydroxyethylethylenediaminetriacetic acid trisodium salt and disodium salt of di-(beta-hydroxyethyl) glycine.

8. Caustic solution containing sodium mercaptide and additionally containing a stabilizing concentration of a stabilizer comprising a mixture of ethylenediaminetetraacetic acid tetrasodium salt, diethylenetriaminepentaacetic acid pentasodium salt, N-hydroxyethylethylenediaminetriacetic acid trisodium salt and disodium salt of di-(beta-hydroxyethyl) glycine.

9. Potassium hydroxide solution containing potassium sulfide and additionally containing a stabilizing concentration of a stabilizer comprising a mixture of ethylenediaminetetraacetic acid tetrasodium salt, diethylenetriaminepentaacetic acid pentasodium salt, N-hydroxyethylethylenediaminetriacetic acid trisodium salt and disodium salt of di-(beta-hydroxyethyl) glycine.

10. Potassium hydroxide solution containing potassium mercaptide and additionally containing a stabilizing concentration of a stabilizer comprising a mixture of ethylenediaminetetraacetic acid tetrasodium salt, diethylenetriaminepentaacetic acid pentasodium salt, N-hydroxyethylethylenediaminetriacetic acid trisodium salt and disodium salt of di-(beta-hydroxyethyl) glycine.

References Cited in the file of this patent

UNITED STATES PATENTS 2,506,492     De Mytt et al. _____ May 2, 1950

OTHER REFERENCES

Bergy: American Journal of Pharmacy, June 1954, p. 212.